United States Patent [19]
Collins

[11] 3,760,261
[45] Sept. 18, 1973

[54] PRINTED CIRCUIT CARD TEST UNIT
[76] Inventor: George Thomas Collins, 12 Blackwood Rd., Streetly, Sutton Coldfield, England
[22] Filed: June 19, 1972
[21] Appl. No.: 264,308

Related U.S. Application Data
[63] Continuation-in-part of Ser. No. 6,719, Jan. 29, 1970, abandoned.

[30] Foreign Application Priority Data
Jan. 23, 1970 Great Britain...................... 3,440/70

[52] U.S. Cl............................................... 324/73 R
[51] Int. Cl. ............................................ G01n 31/00
[58] Field of Search...................... 324/158 F, 73 R, 324/73 PC; 35/19 A

[56] References Cited
UNITED STATES PATENTS
3,143,702  8/1964  Kohler et al. ......................... 324/73
3,302,109  1/1967  Jones .................................... 324/73

FOREIGN PATENTS OR APPLICATIONS
1,000,281  8/1965  Great Britain ........................ 324/73

Primary Examiner—Alfred E. Smith
Attorney—Donald M. Wight et al.

[57] ABSTRACT

A test assembly for testing circuitry on one of a plurality of different but generically related printed circuit cards each having a common type of edge connector comprises an edge connector socket adapted to receive said common edge connector, power supply means for providing suitable voltage levels for said circuitry, a plurality of wander leads for connecting selected terminals of said socket to a plurality of manually operable switches whereby pre-chosen voltage levels may be applied to selected portions of said circuitry on actuation of said switches, together with indicating means associated with said switches to indicate if said selected portions of the circuitry are functioning correctly.

8 Claims, 5 Drawing Figures

PRINTED CIRCUIT CARD TEST UNIT

This application is a Continuation-in-Part of application Ser. No. 6,719 of Jan. 29, 1970 now abandoned.

BACKGROUND OF THE INVENTION

This invention relates to a printed circuit card test assembly for checking the function of a circuit mounted on a printed circuit card.

The invention has particular, but not exclusive, use in the field of automated machine control. For example, a machine for performing a sequence of operations may be electronically controlled by a group of circuits mounted on printed circuit cards. Each card controls one or more steps in the sequence of machine operations which may include, for example, sensing and controlling the movement of machine parts, sensing and control of physical variables such as temperature, pressure, and the like, timing and switching operations, and so on. One example of a machine controlled in this manner is described in my co-pending U.S. Pat. application Ser. No. 6,720 filed Jan. 29, 1970, now abandoned. In said co-pending application there is described an electrically controlled injection molding machine, each machine function or operation in a method of injection molding being controlled by an electronic circuit mounted on an individual printed circuit card. These cards support the necessary electronic circuit components such as amplifiers, logical elements, filters, resistors, capacitors, and the like in suitable configuration to provide, on receipt of input information, output signals which may be supplied to relays such as electrical, hydraulic or pneumatic solenoids controlling various machine operations. For example, the operation of a screw type injection molding machine for molding thermoplastics or thermosetting materials involves the opening and closing of mold halves, the plasticizing of the material in the barrel of the machine, the rotary and reciprocatory movement of a feed screw, the heating of the barrel, the heating or cooling of the mold, the cooling of the screw, the movement of the barrel, the ejection of the molded article, and so on, the mechanical operations all in strict sequence. Not all these individual actions are required in each case, but the particular actions and the sequence thereof for each individual material and each particular type of molding operation will be known.

Electric control systems for machines such as injection molding machines have hitherto been assembled by placing all like parts of the circuitry together, for example, all the filters on one printed circuit board, all the amplifiers on another board, all the timing elements on yet another board, and so on. I have in contrast found it advantageous to place all the components and/or circuitry relating to one machine operation on a single printed circuit board. That is, as far as is possible considering the need for certain adjustable elements, controls and the like to be located in a readily accessible position, for example on a control console. In this context it is important to understand that in the case of an injection molding machine, the term "operation" includes where appropriate the reciprocal of that operation, so that, for example, "mold open" and "mold close" are for all practical purposes one operation and can be controlled by common circuitry mounted on a common printed circuit card. Thus, if a fault occurs in a particular machine operation, the printed circuit card corresponding to that particular machine operation may be easily removed for testing, without at the same time interfering with circuitry concerned with other machine operations. Such removal is facilitated by providing the printed circuit cards and the control console in which they are installed with suitable plug and socket connectors. The cards may have a common type of edge connector and the control console may have a plurality of sockets to receive these edge connectors.

Advantageously all those cards which form a set for use with a particular molding machine, and indeed preferably all of the cards, are constructed so as to bear a generic relationship one to another, in that the same edge connector terminals are always used for power supplies, outputs and inputs, etc., on each card. Naturally, the parts installed on any one card will not necessarily be the same as on another card and naturally no two cards need have exactly the same function in relation to the particular aspects of the molding process which they control. However, by constructing the cards to have this common generic relationship between them, the testing of individual cards from a set is greatly facilitated, as will now be described.

OBJECT OF THE INVENTION

It is an object of this invention to provide a simple and inexpensive test assembly whereby the various components and related circuitry on a particular printed circuit card may be tested for proper operation, both as a whole and where necessary, individually. It is a further object of the invention to provide such a test assembly which is capable of use by a relatively unskilled technician, particularly one who is unfamiliar with electronics and who by following a simple test program can establish the location of a fault. In particular it is an object of the invention to provide a test assembly for testing individual printed circuit cards of a generically related set of cards each capable of controlling one operation of an injection molding machine.

NATURE OF THE INVENTION

In its broadest aspect, the invention provides a portable test assembly for checking the function of any one of a plurality of different but generically related printed circuit cards, each such card including individual components which may malfunction, and each such card having a common type of edge connector presenting a selected number of connector terminals, said test unit comprising:

an edge connector having a plurality of test terminals adapted to receive the type of edge connector common to the cards;

a plurality of wander leads connected to certain of said test terminals and having at their free ends, wander plugs;

a plurality of manually operable bistable and monostable switches having wander lead sockets connected thereto;

power supply terminals for connection to a suitable power supply for providing selected voltage levels which correspond to operating levels of at least one of the components of the cards, each of said power supply terminals being connected to certain ones of said switches;

the wander leads and plugs serving to connect pairs of said certain test terminals and said wander lead sockets so as selectively to provide said selected voltage levels at corresponding test terminals in response to actuation of certain of said switches; and indicating means for selectively indicating, in response to selective actuation of said switches to supply individual components of a card being tested with the requisite operating voltage level, if each of such individual components is functioning correctly.

With respect to the foregoing, a wander lead socket is a socket electrically connected to a circuit into which a lead may be selectively plugged for connecting such lead into the circuit and thereby connect electrical component or components to which the lead is attached into such circuit. A wander lead is a length of wire which is provided on at least one end thereof with a wander plug particularly configurated for plugging into a wander lead socket for electrically connecting the wire into the electrical circuit of which the wander lead socket is a part. The opposite end of the wire may also be provided with a wander plug in which event, the wander lead or wire may electrically connect together two wander lead sockets. On the other hand, the wander lead or wire may have the other end thereof connected to an electrical component or electrically connected into the circuit as a selectively connectable lead thereof.

In the above assembly, by following a suitable test program, a printed circuit card may be checked for correct operation.

DESCRIPTION OF THE PREFERRED EMBODIMENT

Figure 1:
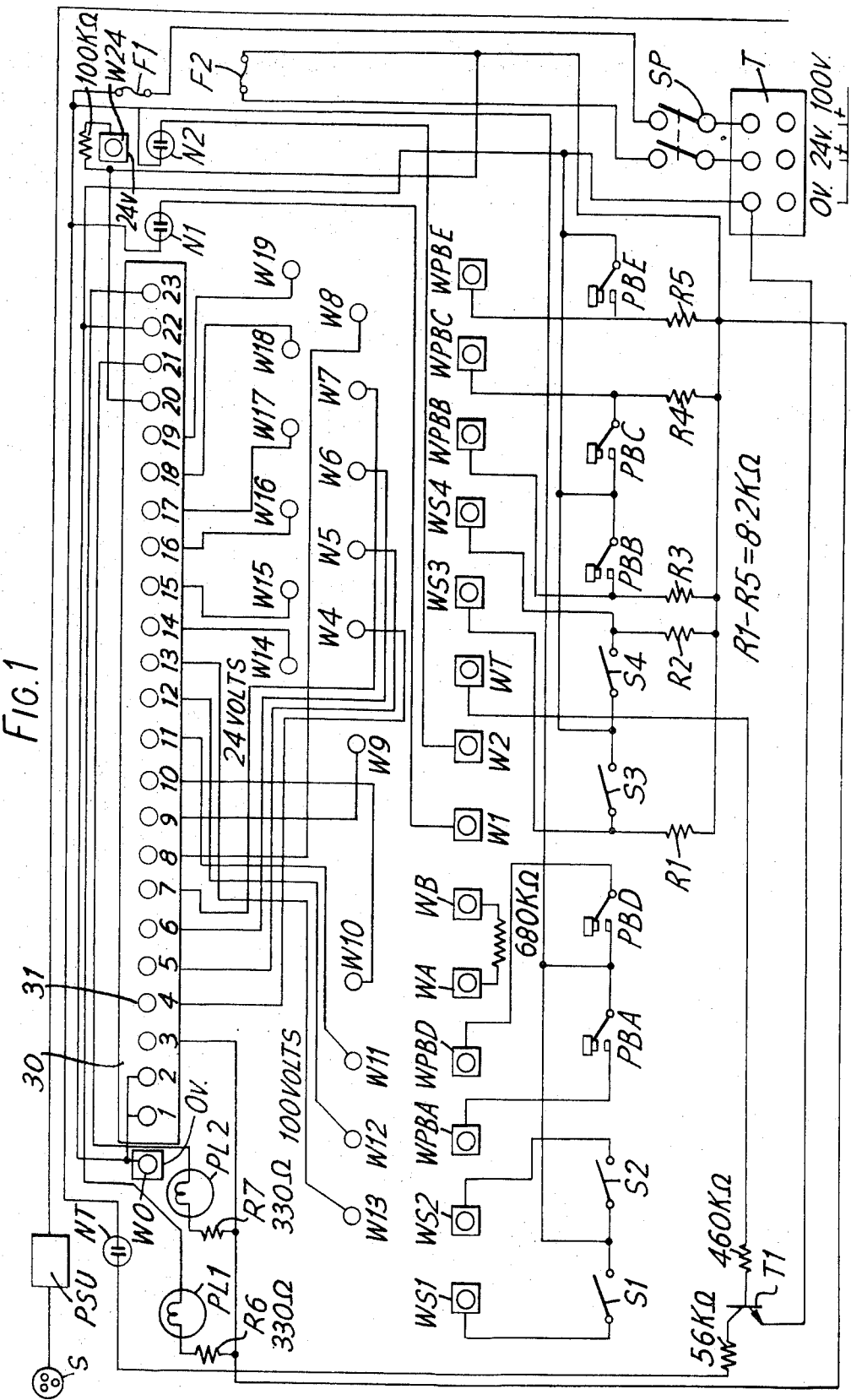
Figure 2:
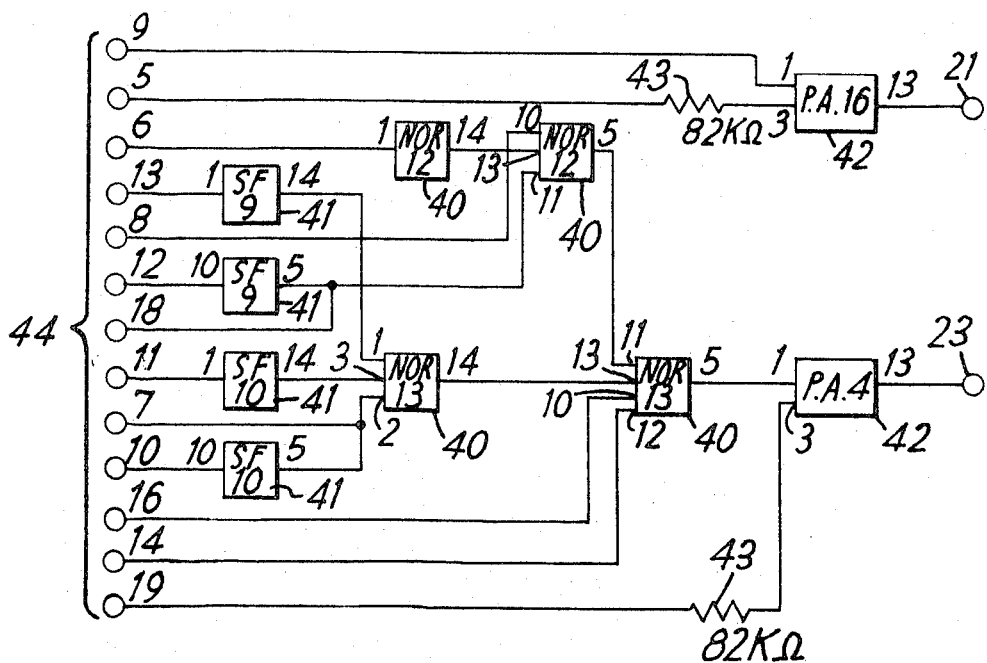
Figure 3:
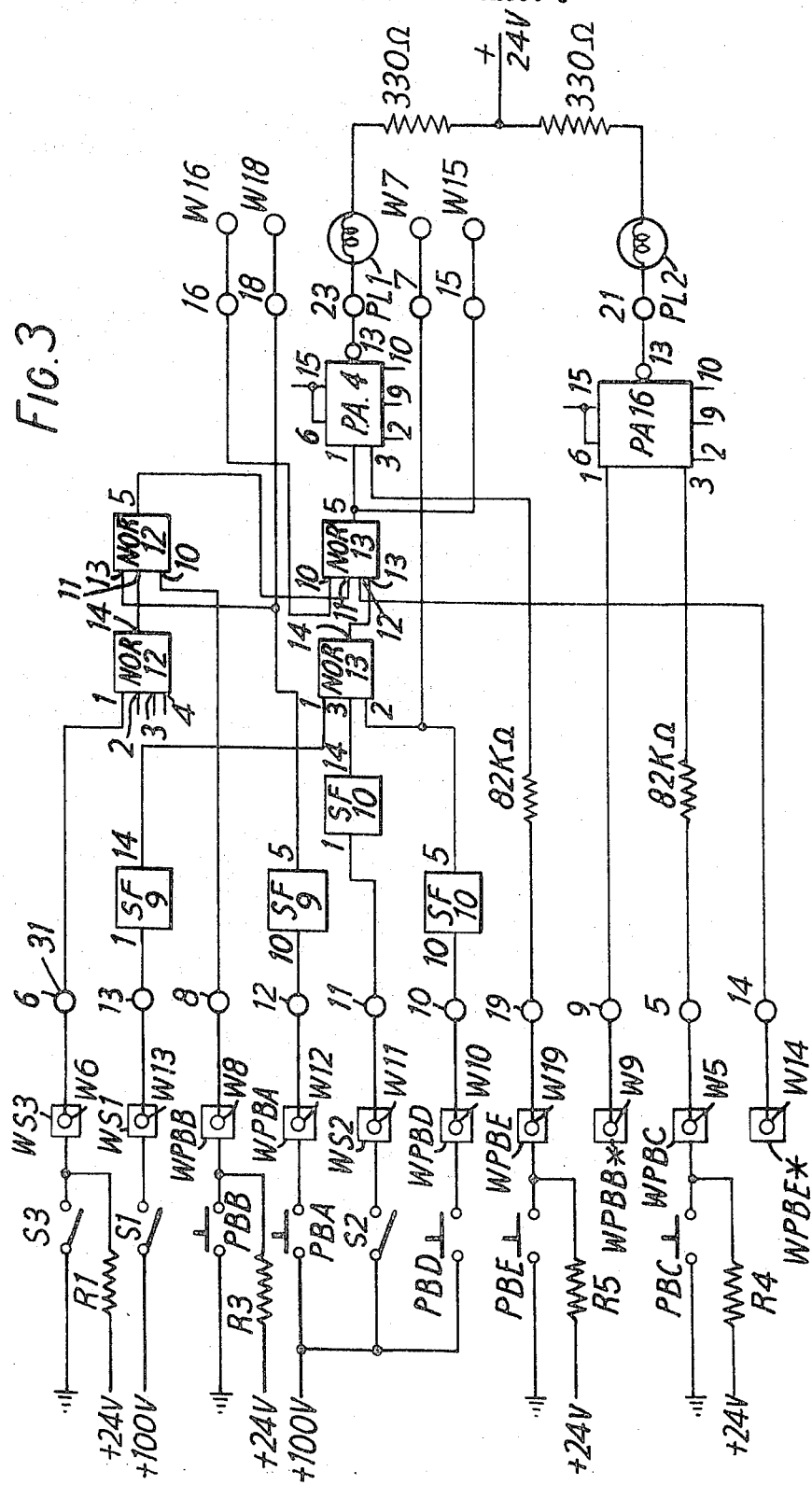
Figure 4:
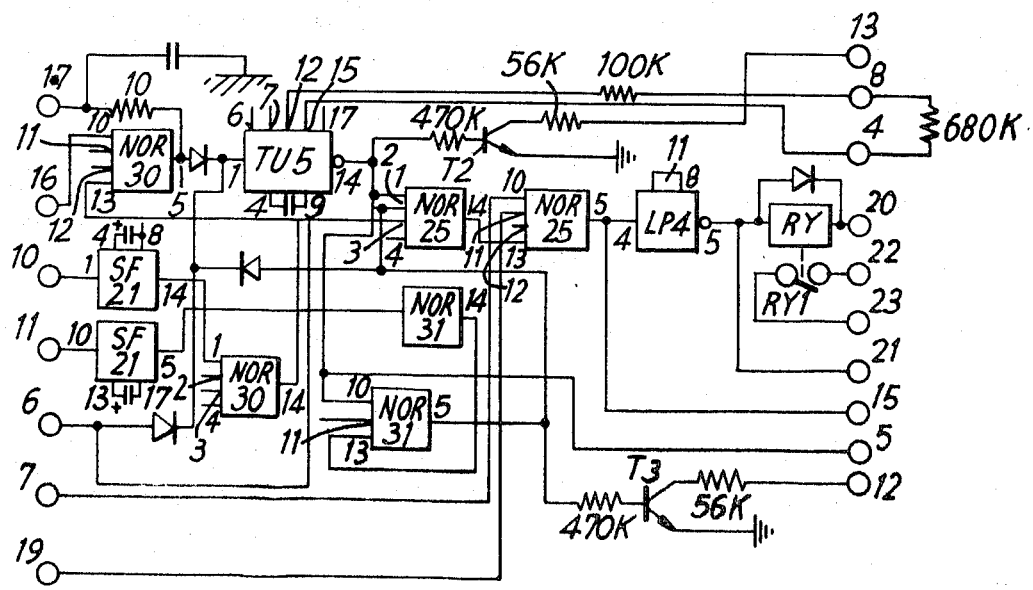
Figure 5:
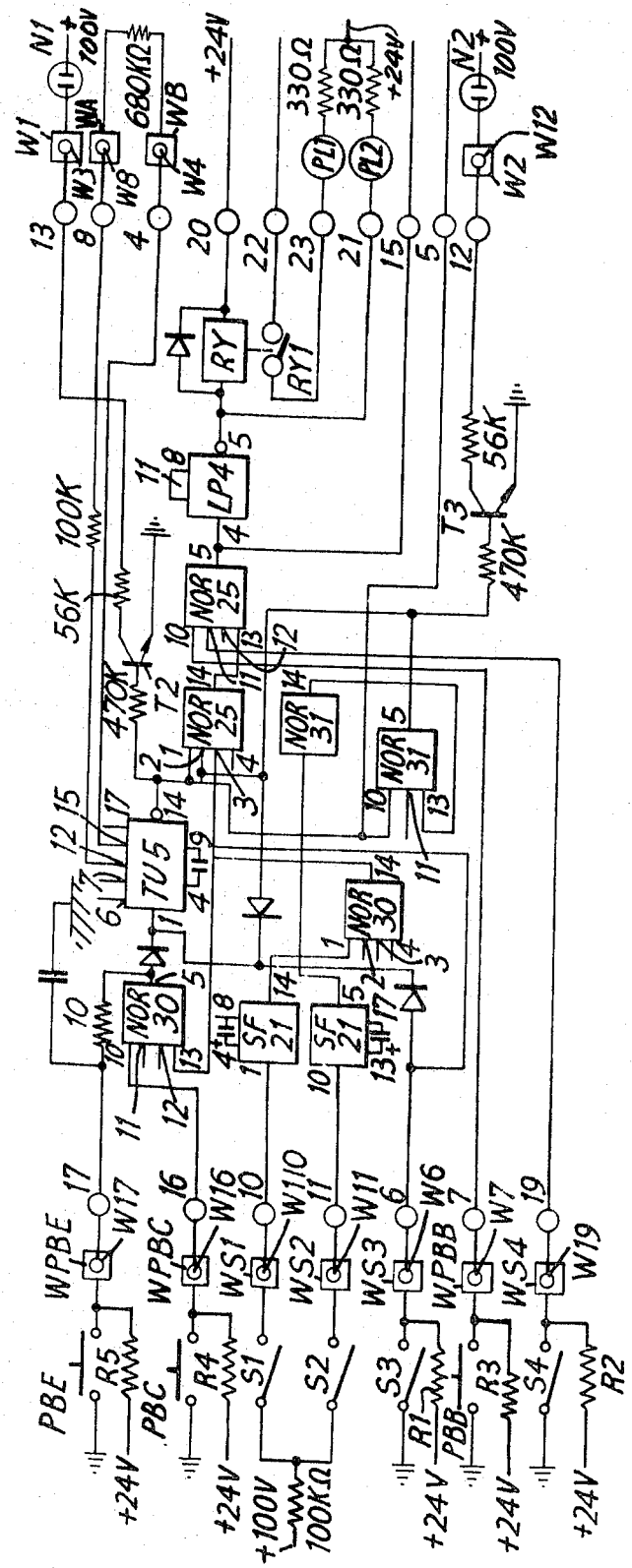

In the accompanying drawings:

FIG. 1 is a schematic circuit diagram and layout of a printed circuit card test assembly, FIG. 2 is a schematic circuit diagram of a typical printed circuit card, FIG. 3 schematically illustrates the connection of the printed circuit card shown in FIG. 2, to the test assembly of FIG. 1, FIG. 4 is a schematic diagram of a second typical printed circuit card, and FIG. 5 schematically illustrates the connection of the printed circuit card of FIG. 4 to the test unit of FIG. 1.

In FIG. 1, a socket edge connector 30 including a plurality of aligned sockets 31 is preferably mounted in a horizontal plane on the control panel (not shown) of a case (not shown) housing the test assembly. Also mounted on the control panel are a plurality of switches S1 through S4, push-buttons PBA-PBE, and wander leads terminating in wander plugs W4 through W19. The wander leads are connected at the end remote from the wander plugs to certain of the edge connector sockets 31. Also there are wander plug sockets WS1 through WS4, WPBA through WPBE, and WA, WB, W0, W1, W2 and WT, and indicator lamps PL1, PL2, N1, N2 and NT. The aforementioned edge connector sockets 31, switches, push-buttons, wander leads, wander plug sockets and indicator lamps are interconnected as shown in the drawing. The circuit includes one transistor T1 whose function is described later, a plurality of resistors shown by the standard resistor symbol, fuses F1 and F2, and power switch SP and a power supply terminal block T. Connected to the power supply terminals and shown schematically as a single line, is a lead connected to a power supply unit PSU including, for example, a suitable step-down transformer, rectifier and smoothing circuit, the power supply unit being connected to a three-pin socket S for connection to a source of electricity.

Each of the wander plugs identified as W4 through W19 is connectable by virtue of its wander lead to one of the wander plug sockets WS1 through WS4, etc.

FIG. 2 schematically illustrates a typical printed circuit card the correct functioning of which may be checked by the assembly shown in FIG. 1. The particular card illustrated is for controlling mold movement in an injection molding machine. Circuit components such as NOR gates 40, filters 41, power amplifiers 42, and a resistor 43 are interconnected as shown between edge pin connectors generally indicated at 44 and output terminals 21 and 23. The gates, filters and amplifiers are respectively designated in conventional manner "NOR," "SF" and "PA" these being used in conjunction with an identifying suffix numberal; a prefix numeral serves to identify a particular terminal of the component. The edge connector pins 44 are shown in random order in FIG. 2 for the sake of clarifying the circuit diagram but, in actual use, they are connected in sequential numbered order and spaced to correspond with correspondingly numbered edge connector sockets 31 on the edge connector 30 shown in FIG. 1.

FIG. 3 is a diagram illustrating the interconnections between the card of FIG. 2 and the test assembly, including the switches used in the test sequence, and showing how the wander leads connect between particular edge connector sockets and selected wander plug sockets WS1, WPBB, etc., via plugs W4 through W19. It will be noted that two of the push-buttons (PBB, PBE) appear twice in FIG. 3. This is because the particular test program requires that two of the wander plugs are moved to different sockets during the test program, which will be described later. To avoid confusion the second positions of these two plugs are identified by asterisks. The circuit shown connected to the edge connector sockets 31 is the circuit schematically illustrated in FIG. 2. Like reference numerals identify like components in FIGS. 1 through 3.

The principle embodied in the test assembly of FIG. 1 is to supply appropriate logical "0" or logical "1" voltage levels to selected circuit components on a printed circuit card such as that shown in FIG. 2, by operating the switches, push-buttons and connecting wander leads between appropriate wander lead sockets as shown in FIG. 3. Also embodied in this principle is the provision of suitable indicator lamps for selective connection to circuit components on the printed circuit card and to appropriate power supplies to indicate the correct or incorrect functioning of particular circuit components responsive to the application of the appropriate voltage levels.

The following two schedules are typical of individual tests which may be applied to corresponding printed circuit cards. Each type of card has its own test schedule and by following this and ensuring that the indicator lamps light as mentioned, the printed circuit card is checked for correct operation. Should an indicator lamp not light correctly, the usual instruction is to check for a "1" on a conductor connected to a particular terminal of the component in question. The "1" referred to is a logical "1," in other words a potential signal other than zero potential. The presence of a potential signal may be checked with a test probe inserted in wander plug socket WT connected via transistor T1 to neon indicator lamp NT. The transistor T1 is connected as a switch responsive to a signal applied to its base, so that the application of a positive voltage representing a logical "1" state causes the transistor to conduct, bringing thereby its collector to, or very near to, ground potential. Because of the 100 volt potential applied to one terminal of the neon indicator lamp NT this appearance of ground potential at the collector of the transistor causes the indicator lamp to light. Removal of the logical "1" signal restores the initial non-conducting state of the transistor and the indicator lamp is extinguished. Conveniently, the test probe used may take the form of a wander lead having at one end a wander plug insertable into socket WT, and at the other end a test prod with an insulated handle.

In like manner, the wander plug sockets W1, W2 are connected respectively to neon indicator lamps N1 and N2. Grounding either of these sockets causes the appropriate indicator lamp to light, thereby providing for simple ground continuity checks to be made, as well as tests of the kind described later under Test Schedule 2.

An exemplary test schedule for checking the printed circuit card shown in FIGS. 2 and 3 is as follows, designations such as "1SF9" meaning terminal 1 of filter SF9 and instructions such as "Insert W7 into socket WT" meaning that wander plug W7 is to be inserted temporarily into wander plug socket WT before performing the test step (or steps) immediately following. Where an instruction to close a particular switch is given, it is to be understood that at the end of the test the switch to be opened before proceeding to the next test (unless specific instructions to the contrary are given).

Firstly the card is inserted into the edge connector socket 30 of the test assembly of FIG. 1, so that like numbered connectors on the card engage the like numbered connectors 31. Referring to FIG. 3, the wander plugs are inserted into the appropriate sockets, bearing in mind that two of the plugs are moved during the test program which is as follows:

TEST SCHEDULE 1

1. Close S1. PL1 should light, if not check for a "1" on 1SF9, 1NOR13, 1PA4.
2. Press PBD. PL1 should light, if not check for a "1" on 10SF10, 2NOR13. Insert W7 into wander plug socket WT, press PBD. The lamp NT should light.
3. Close S2, PL1 should light; if not check for a "1" on 1SF10, 3NOR13.
3A. Insert W16 into socket WS4. Close S1, PL1 should light; close S4, PL1 should go out. If not, check for a "1" on 10NOR13.
4. Close S1 lighting PL1. Close S3, PL1 light should go out. If not check for a "1" on 1NOR12, 11NOR13.
5. Insert W18 into socket WT. Press PBA, the lamp NT should light, if not check for a "1" on 10SF9.
6. Close S1 and S3, PL1 light will be off. Press PBB and PL1 should light, if not check for "1" on 10NOR12. Press PBA, PL1 should light, if not check for "1" on 11NOR12.
7. Insert W15 into socket WT. Close S1. The lamp NT should light, if not check for a "1" on 1SF9, 1NOR13, 1PA4.
8. Press PBE, PL1 should light, if not check for a "1" on 3PA4. Change wander plug connections to PBB and PBE over to their second positions designated by asterisks in FIG. 3, i.e., by inserting W9 into socket WPBB and W14 into socket WPBE as shown.
9. Press PBB, PL2 should light, if not check for a "1" on 1PA16.
10. Press PBC, PL2 should light, if not check for a "1" on 3PA16.
11. Close S1 to light PL1. Press PBE, PL1 should go out, if not check for a "1" on 12NOR13.
12. Insert W7 into socket WT. Press PBD. The lamp NT should light, if not check for a "1" on 10 and 5SF10 when PBD is pressed.

This completes the test schedule for the printed circuit card of FIG. 2, the operation of the components and associated circuitry having been completely checked item by item.

Bearing in mind the principles set out in the foregoing general description an exemplary test schedule for the printed circuit card of FIG. 4 will now be given, using the schematic of FIG. 5 to illustrate how selected wander plugs are set up to test this card. It will be noted that this card which controls the malfunction alarm system of a molding machine makes use of not only lamps PL1, PL2 but also of both neon indicator lamps N1, N2 and the wander plug sockets WA, WB, the latter being interconnected by a 680K ohm resistor as shown in FIG. 1. This card contains in addition to gates (NOR) and filters (SF), a timing block TU5, two transistors T2, T3 respectively (both connected as switches, in like manner to T1, as described earlier), a power amplifier, LP4, and a reed switch RY having normally open contacts RY1. Also the circuit includes several diodes, resistors and capacitors which are shown by conventional symbols.

TEST SCHEDULE 2

1. Close and open S1. After 66 seconds PL1 and PL2 should lihgt, together with N1. If not, check for "1" on 10NOR30 and also for "0" on 1TU5. Check that W4 and W8 are correctly inserted into sockets WA and WB (Note: the 680K ohm resistor is used in this test as a timing element to control the delay in operation of timing block TU5).
2. Remove W8 from socket WB. Close S1 and insert W15 into socket WT. Close S3, PL1 and PL2 and NT should all light. If not check for a "1" on 3NOR25, 5NOR25, 4LP4. NB: Do not replace W8 into socket WB until instructed.
3. Close S3, press PBB. PL1 and PL2 should go out. If not check for "1" on 10NOR25.
4. Close S3, close S4. PL1 and PL2 should go out. If not check for "1" on 11NOR25.
5. Close S2. PL1, PL2 and N2 should all light. If not, check for "1" on 10SF21, 1NOR31, 5NOR31 and 2NOR25.
6. Replace W8 into socket WB, allow the time delay of TU5 to operate as in test 1, until the lamps PL1 and PL2 light. Hold PBC closed and close S1. Both lamps should remain lit. Release PBC and the lamps should go out. If not, check for a "1" on 1SF21, 1NOR30 and 1TU5.
7. At the end of the time delay period when PL1 and PL2 are both lit, close S1. Both lamps should go out. If not, check for "1" on 1SF21, 1NOR30 and 5NOR30.

The foregoing completes the testing of this particular card and it will be seen that all the functions of the test assembly have been employed, with the exception of sockets W0 and W24 which are available as sources of logical "0" and "1" respectively, if required.

Although the test assembly of FIG. 1 was purpose-made for checking the operation of any one of a plurality of different but generically related printed circuit cards for controlling a sequence of operations in an electrically controlled injection molding machine as described in my copending U.S. Pat. application Ser. No. 6,720, the principle of the invention may be embodied in other configurations to check the continuity and correct function of other types of printed circuit cards. A significant advantage of the test assembly shown in FIG. 1 lies in its flexibility, in that any one of a plurality of printed circuit cards having a generic relationship to one another may be checked against an individual test schedule to ensure the correct functioning of the components and circuitry. Furthermore, the use of wander leads and wander plugs as opposed to switches very greatly increases the adaptability of the test assembly in this respect because if it is ever necessary to design and construct for example new printed circuit cards, these latter can still be tested by selecting a suitable test schedule, despite the fact that they may include components and/or hardware not previously used. The only essential is that the new cards must be generically related to the old ones; that is they should use the same power, input and output connections.

In the above description, it has been explained that certain common relationships exist among the entire set of printed circuit cards with which the assembly of FIG. 1 is usable. For example, each printed circuit card has a number of inputs responsive to logical "zero" and logical "one" voltages at a first number of the edge connector terminals and, as well, a number of inputs responsive to a further voltage and the absence thereof at a further number of edge connector terminals to produce a logical "one" and a logical "zero" selectively within the circuits. The testing assembly supplies voltages corresponding to the logical "zero" and logical "one " and further voltages and has a set of wander leads connected at one end to those edge connector terminals corresponding to the aforesaid inputs of the printed circuit cards and each having at their free ends a wander plug. It is also provided with a set of wander plug sockets enabling selective connection between said edge connector terminals and selected ones of a plurality of monostable and bistable manually operable switches which are connected to the logical " zero" and the logical "one" voltages and which are operable to apply these voltages selectively to certain of the set of wander plug sockets. Manually operable monostable and bistasble switches are operable to apply the stated further voltage selectively to others of the set of wander plug sockets.

The printed circuit cards have outputs at one or both of a certain pair of the edge connector terminals (it being appreciated that a greater number of outputs is within the purview of this invention) and the indicating devices of the testing assembly are connected directly to the pair of edge connector sockets corresponding to this pair of edge connector terminals. In this way, a program of wander lead connections between the sets of edge connector terminals and selected wander plug sockets together with a corresponding program of switch actuations may be made for each printed circuit card so as to indicate proper operation or condition of all the individual components of the printed circuit card by effecting operation or energization of one or the other or both of the indicator devices. The inclusion of a further indicating device and a transistor switch, responsive to logical "one" voltage input, connected between said further voltage and ground potential and having an input connected to a wander plug socket of said set thereof as described in detail earlier, constitutes an added refinement of the test assembly. Such inclusion permits the detection of the presence or absence of logical "one" voltages at various points on the printed circuit cards. It further permits the testing of printed circuit cards whereof the output signals are not amplified and are therefore not suitable to directly operate or energise one or both of the first pair of indicating devices. Thus, a specific co-operation exists between the individual printed circuit cards of the set and the physical arrangement of the elements of the testing assembly so that rapid and efficient testing of any of the printed circuit cards of the set may be effected without expertise or special knowledge on the part of the operator performing the tests.

Therefore, the test assembly of the invention lends itself to rapid trouble-shooting procedures, greatly reducing thereby lost production time due to component failures. This is in complete contrast to the difficult and time-consuming procedures involved in checking by conventional means such as a general purpose volt-ohm-ampere test meter, especially in the case of complex circuitry, where specialised knowledge on the part of the technician would be essential.

What I claim is:

1. A portable test assembly for checking the function of any one of a plurality of different printed circuit cards, each such card including individual components which may malfunction, and each such card having a common type of edge connector presenting a selected number of connector terminals, said test assembly comprising:

an edge connector having a plurality of test terminals adapted to receive the type of edge connector common to the cards;

a plurality of wander lead terminals connected to certain of said test terminals;

a plurality of manually operable bistable and monostable switches having wander lead sockets connected thereto;

power supply terminals for connection to a suitable power supply for providing selected voltage levels which correspond to operating levels of at least one of the components of the cards, each of said power supply terminals being connected to certain ones of said switches;

a plurality of wander leads for connecting pairs of said wander lead terminals and said wander lead sockets so as selectively to provide said selected voltage levels at corresponding test terminals in response to actuation of certain of said switches; and indicating means for selectively indicating, in response to selective actuation of said switches to supply individual components of a card being tested with the requisite operating voltage level, if each of such individual components is functioning correctly.

2. A portable test assembly as defined in claim 1 including resistance elements connecting one of said power supply terminals which supplies voltage at one level to certain of said wander lead sockets, which certain wander lead sockets are associated with switches having connection to another power supply terminal of lower voltage level.

3. A portable test assembly according to claim 1, in which said printed circuit cards are each provided with pin edge connectors, and said test assembly is provided with corresponding socket edge connectors.

4. A portable test assembly according to claim 1 including a wander lead socket for connection to a test probe, said socket being connected to a circuit including an indicator lamp and a power supply terminal, said test probe and said indicator lamp being provided for determining whether a signal is present on a terminal of each of said individual components.

5. A portable test assembly according to claim 4, in which said test probe socket is connected to said indicator lamp via a transistor circuit.

6. A portable test assembly according to claim 5, in which said means for selectively indicating the correct function of each said individual components comprises a plurality of neon and filamentary lamps.

7. For use in combination with a set of printed circuit cards each having an edge connector presenting a selected number of a common set of connector terminals and each having a number of circuit components and associated circuitry connected between said selected number of connector terminals; said set of circuit cards having outputs appearing at a certain pair of said connector terminals, a number of inputs responsive to logical "zero" and logical "one" voltages at a first number of said connector terminals and a number of inputs responsive to a further voltage and the absence thereof at a further number of connector terminals to produce a logical "one" and a logical "zero" selectively within the circuits, a test assembly for use with any one of said circuit cards comprising;

an edge connector having a set of test terminals corresponding to and engagable with said common set of connector terminals;

power supply means for providing said logical "zero," said logical "one" and said further voltages;

a pair of indicator devices connected respectively to those test terminals corresponding to said certain pair of connector terminals;

a first set of wander leads connected to those test terminals corresponding to said first number and said further number of connector terminals said wander leads each having at the free ends thereof a wander plug;

a set of wander lead sockets each adpated to receive one of said wander plugs a plurality of manually operable monostable switches and a plurality of manually operable bistable switches connecting said logical "zero" and said logical "one" voltages selectively to certain of said set of wander lead sockets and a plurality of manually operable monostable switches and a plurality of manually operable bistable switches connecting said further voltage selectively to others of said set of wander lead sockets, whereby discrete programs of wander lead connections made by inserting selected wander plugs into selected wander lead sockets and corresponding programs of switch actuations are effective to indicate proper operation of all of the individual components and associated circuitry of each of said circuitry cards by effecting energization of said indicator devices.

8. For use in the combination as defined in claim 7 wherein said test assembly also includes a further indicating device and a transistor switch, responsive to logical "one" voltage input, connected between said further voltage and ground potential and having an input connected to a wander lead socket of said set thereof.

* * * * *